US008566144B2

(12) United States Patent
Round et al.

(10) Patent No.: US 8,566,144 B2
(45) Date of Patent: Oct. 22, 2013

(54) CLOSED LOOP VOTING FEEDBACK

(75) Inventors: Matthew J. Round, West Lothian (GB); Aniruddha Gadre, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 2106 days.

(21) Appl. No.: 11/098,008

(22) Filed: Mar. 31, 2005

(65) Prior Publication Data
US 2006/0224442 A1 Oct. 5, 2006

(51) Int. Cl.
*G06Q 10/00* (2012.01)
(52) U.S. Cl.
USPC ............... 705/7.38; 705/7.39; 705/7.42
(58) Field of Classification Search
None
See application file for complete search history.

(56) References Cited

U.S. PATENT DOCUMENTS

| | | | | |
|---|---|---|---|---|
| 5,117,353 A * | 5/1992 | Stipanovich et al. | ........ | 705/7.14 |
| 5,537,618 A * | 7/1996 | Boulton et al. | ................ | 715/745 |
| 5,551,880 A | 9/1996 | Bonnstetter et al. | | |
| 5,790,426 A * | 8/1998 | Robinson | ....................... | 702/179 |
| 5,884,282 A * | 3/1999 | Robinson | ....................... | 705/7.33 |
| 6,041,311 A * | 3/2000 | Chislenko et al. | ............ | 705/26.7 |
| 6,049,777 A * | 4/2000 | Sheena et al. | ................. | 705/7.32 |
| 6,112,186 A * | 8/2000 | Bergh et al. | .................... | 705/7.32 |
| 6,260,019 B1 | 7/2001 | Courts | | |
| 6,389,372 B1 * | 5/2002 | Glance et al. | .................. | 702/189 |
| 6,606,624 B1 * | 8/2003 | Goldberg | ............................... | 1/1 |
| 6,739,508 B2 * | 5/2004 | Ushioda et al. | ............... | 235/386 |
| 6,807,566 B1 * | 10/2004 | Bates et al. | .................... | 709/206 |
| 6,892,178 B1 * | 5/2005 | Zacharia | ....................... | 705/7.29 |
| 6,892,179 B1 * | 5/2005 | Zacharia | ............................ | 705/4 |
| 6,895,385 B1 * | 5/2005 | Zacharia et al. | ............. | 705/7.29 |
| 7,013,303 B2 * | 3/2006 | Faybishenko et al. | ................ | 1/1 |
| 7,306,148 B1 * | 12/2007 | Morganstein | ................. | 235/386 |
| 7,343,374 B2 * | 3/2008 | Berkhin | ............................... | 1/1 |
| 7,370,381 B2 * | 5/2008 | Tuttle et al. | ................... | 707/748 |
| 7,433,832 B1 * | 10/2008 | Bezos et al. | .................. | 705/26.8 |
| 7,437,309 B2 * | 10/2008 | Magrino et al. | ............. | 705/7.14 |
| 7,467,206 B2 * | 12/2008 | Moore et al. | ................... | 709/225 |
| 7,472,097 B1 * | 12/2008 | Scarborough et al. | .......... | 706/26 |
| 7,478,121 B1 * | 1/2009 | Nickerson et al. | ............ | 709/203 |
| 7,493,320 B2 * | 2/2009 | Canright et al. | ....................... | 1/1 |
| 7,502,748 B1 * | 3/2009 | Baldwin et al. | .............. | 705/7.14 |
| 7,519,562 B1 * | 4/2009 | Vander Mey et al. | ......... | 705/500 |
| 7,555,441 B2 * | 6/2009 | Crow et al. | ................... | 705/7.14 |
| 7,558,767 B2 * | 7/2009 | Scarborough et al. | .......... | 706/21 |
| 7,562,059 B2 * | 7/2009 | Scarborough et al. | .......... | 706/21 |
| 7,606,778 B2 * | 10/2009 | Dewar | ............................ | 706/21 |
| 7,627,486 B2 * | 12/2009 | Musgrove et al. | .............. | 705/1.1 |
| 7,797,345 B1 * | 9/2010 | Martino et al. | ................ | 707/792 |
| 8,103,540 B2 * | 1/2012 | Gross | ............................ | 705/7.33 |
| 8,244,563 B2 * | 8/2012 | Coon et al. | ..................... | 705/7.11 |

(Continued)

OTHER PUBLICATIONS eBay's Feedback Forum web site, archived on Oct. 12, 1999 by web.archive.org [URL: http://web.archive.org/web/19991012065814/pages.ebay.com/ . . . ].*

*Primary Examiner* — Brett Feeney
(74) *Attorney, Agent, or Firm* — Thomas | Horstemeyer, LLP

(57) ABSTRACT

Embodiments of the present invention provide a system and method for providing reviewer feedback identifying a correlation between a reviewer's past voting record and successful results. Based on a reviewer's past record, the reviewer may be assigned a power rating identifying the statistical accuracy of the reviewer's voting history. That power rating may be used to weight future votes, thereby increasing the likelihood that accurate decisions will be made.

33 Claims, 12 Drawing Sheets

(56) References Cited

U.S. PATENT DOCUMENTS

| | | | |
|---|---|---|---|
| 2001/0034011 A1* | 10/2001 | Bouchard | 434/236 |
| 2002/0032630 A1 | 3/2002 | Peng et al. | |
| 2002/0046199 A1 | 4/2002 | Scarborough et al. | |
| 2002/0046203 A1* | 4/2002 | Siegel et al. | 707/1 |
| 2002/0103695 A1* | 8/2002 | Urken et al. | 705/12 |
| 2002/0120609 A1* | 8/2002 | Lang et al. | 707/1 |
| 2002/0128894 A1 | 9/2002 | Farenden | |
| 2002/0133365 A1* | 9/2002 | Grey et al. | 705/1 |
| 2002/0178057 A1* | 11/2002 | Bertram et al. | 705/14 |
| 2002/0193066 A1* | 12/2002 | Connelly | 455/2.01 |
| 2002/0198766 A1* | 12/2002 | Magrino et al. | 705/11 |
| 2003/0182177 A1* | 9/2003 | Gallagher et al. | 705/10 |
| 2003/0233274 A1* | 12/2003 | Urken et al. | 705/12 |
| 2003/0236698 A1* | 12/2003 | Miyagi et al. | 705/11 |
| 2004/0138944 A1* | 7/2004 | Whitacre et al. | 705/11 |
| 2004/0158497 A1* | 8/2004 | Brand | 705/26 |
| 2004/0172267 A1* | 9/2004 | Patel et al. | 705/1 |
| 2004/0225577 A1* | 11/2004 | Robinson | 705/26 |
| 2005/0080656 A1* | 4/2005 | Crow et al. | 705/8 |
| 2005/0125307 A1* | 6/2005 | Hunt et al. | 705/26 |
| 2005/0149383 A1* | 7/2005 | Zacharia et al. | 705/10 |
| 2005/0261953 A1* | 11/2005 | Malek et al. | 705/10 |
| 2006/0143158 A1* | 6/2006 | Ruhl et al. | 707/3 |
| 2006/0212305 A1* | 9/2006 | Bogle et al. | 705/1 |
| 2006/0212338 A1* | 9/2006 | Bogle et al. | 705/10 |
| 2006/0212448 A1* | 9/2006 | Bogle et al. | 707/7 |
| 2006/0212476 A1* | 9/2006 | Bogle et al. | 707/104.1 |
| 2007/0219815 A1* | 9/2007 | Robinson et al. | 705/1 |
| 2008/0027783 A1* | 1/2008 | Hughes et al. | 705/9 |
| 2008/0167936 A1* | 7/2008 | Kapoor | 705/9 |

* cited by examiner

PERFORMANCE RATING
EMPLOYEE: CATHY  ~505

POSITION: TECHNICAL ADVISOR ~501
HIRE DATE: 11/13/2003
REVIEW DATE: 11/13/2004

EMPLOYEE RATING: 1  ~503

| REVIEWER | TIME | PWR | INITIAL VOTE | SCREEN VOTE | INTERVIEW VOTE |
|---|---|---|---|---|---|
| REVIEWER1 | ★ | 😐 | PURSUE | PURSUE | REJECT |
| REVIEWER2 | ★ | 💪 | REJECT | REJECT | REJECT |
| REVIEWER3 | 😴 | 🙂 | PURSUE | HOLD | HIRE |
| REVIEWER4 | 😴 | 💪 | PURSUE | PURSUE | HIRE |
| REVIEWER5 | ★ | ☹ |  | REJECT | HOLD |

*Fig.5.*

| REVIEWER | RESPONSE TIME | POWER | REMARKS |
|---|---|---|---|
| REVIEWER1 | ⓧ | ☺ | ～～～～ |
| REVIEWER2 | ★ | ☺ | ～～～～ |
| REVIEWER3 | 😴 | ☺ | ～～～～ |
| REVIEWER4 | 😴 | ☺ | ～～～～ |
| REVIEWER5 | ★ | ☹ | ～～～～ |

*Fig.6.*

| POWER | REVIEWERS | INITIAL VOTES | POSITIVE INITIAL VOTE RATE | INITIAL VOTE CONSISTENCY | INITIAL TIMELINESS | SCREENING VOTES | POSITIVE SCREENING VOTE RATE | SCREENING VOTE CONSISTENCY | SCREENING TIMELINESS | INTERVIEW VOTES | POSITIVE INTERVIEW VOTE RATE | INTERVIEW VOTE CONSISTENCY | INTERVIEW TIMELINESS | OFFER ACCEPTED | TOTAL CONSISTENCY AVERAGE | TOTAL TIMELINESS AVERAGE | RESULTS AVERAGE |
|---|---|---|---|---|---|---|---|---|---|---|---|---|---|---|---|---|---|
| 2 | REVIEWER1 | 111 | 100% | 20% | 100% | 20 | 100% | 30% | 93% | 6 | 100% | 17% | 75% | 1 | 22% | 89% | 43% |
| 4 | REVIEWER2 | 250 | 36% | 50% | 75% | 40 | 20% | 100% | 60% | 8 | 50% | 100% | 100% | 7 | 83% | 78% | 80% |
| 3 | REVIEWER3 | 193 | 50% | 50% | 50% | 40 | 50% | 48% | 50% | 10 | 60% | 50% | 50% | 3 | 49% | 50% | 50% |
| 5 | REVIEWER4 | 740 | 40% | 98% | 66% | 200 | 75% | 88% | 100% | 200 | 75% | 88% | 80% | 132 | 91% | 82% | 88% |
| 1 | REVIEWER5 | 631 | 100% | 12% | 80% | 50 | 30% | 15% | 74% | 50 | 30% | 15% | 60% | 2 | 14% | 71% | 12% |

*Fig. 7.*

CLOSED LOOP VOTING FEEDBACK

FIELD OF THE INVENTION

In general, the present invention relates to computer software and, in particular, to a system and method for providing a correlation between past voting of a reviewer and successful results.

BACKGROUND OF THE INVENTION

Traditionally, voting decisions do not take into account a reviewer's past voting history. For example, reviewers responsible for hiring employees frequently vote on whether a job candidate should be offered a job. There is typically no deference given to reviewers who have historically voted to hire candidates that have resulted in good employees. Likewise, there typically is no discredit assigned to reviewers who consistently vote to hire candidates that turn out to be poor performers, or bad employees. In general, whoever is available to interview a candidate and vote on that candidate will likely be given an equal vote, regardless of their past voting history.

In addition to providing no correlation between a reviewer's past voting history and the success of those votes, there is typically no way to track the timeliness with which reviewers provide their votes. Continuing with the above example, even though several individuals may be available to conduct an interview of a job candidate, they may be delinquent in actually providing feedback with respect to that interview, thereby slowing down the hiring process. Such a delay may result in good job candidates accepting positions elsewhere, or a long gap in a job opening before a hiring decision can be made.

Accordingly, there is a need for a system and method that provides voting feedback based on an individual's past voting history. Additionally, there is a need for a system and method that takes into consideration the timeliness with which individuals provide their votes.

SUMMARY OF THE INVENTION

Embodiments of the present invention provide a system and method for providing reviewer feedback identifying a correlation between a reviewer's past voting record and results of their voting. Based on a reviewer's past voting record, the reviewer may be assigned a power rating. In one aspect, the power rating may identify whether a reviewer is good at making decisions that result in a desired outcome. The power rating may be used to weight future votes, thereby increasing the likelihood that better decisions will be made.

While embodiments of the invention will be described primarily with respect to votes provided from reviewers of job candidates for a job position, it will be appreciated by one of skill in the art that principles of the present invention may be applied to any type of decision-making process that uses voting to make a collective decision. For example, embodiments of the present invention may be used when selecting a marketing strategy; electing new company officers, board of directors, or management; selecting inventions for which patent protection should be sought, etc.

In accordance with an aspect of the present invention, a method for providing feedback based on voting activity of a reviewer is provided. The method includes receiving a reviewer's vote with respect to a decision to be made, determining a consistency of the reviewer's vote in relation to votes of other reviewers with respect to the decision to be made, and providing a power rating for the reviewer based at least, in part, on the determined consistency of the reviewer's vote.

In accordance with another aspect of the present invention, a method for assigning a power rating to a reviewer is provided. The method initiates by receiving a vote from the reviewer with respect to a decision to be made. Based on that vote, a power rating of the reviewer is assigned. In one embodiment, the power rating is assigned based on whether the vote was timely. The method also decides, based on votes received, the decision to be made. Based on the decision made a performance review may be received identifying an assessment of the outcome of the decision. Based on the performance review, the power rating of the reviewer may be adjusted.

Another aspect of the present invention provides a computer-accessible medium having instructions stored thereon that direct a computing system to adjust a power rating of a reviewer over time. The method includes receiving a first plurality of votes corresponding to an object, wherein at least one of the first plurality of votes corresponds to a first vote received from the reviewer. Based on the first plurality of received votes, the method determines whether to take an action with respect to the object. If the action is undertaken, a second plurality of votes corresponding to the object is received, wherein at least one of the second plurality of votes corresponds to a second vote received from the reviewer. Based on the second plurality of received votes, a determination is made as to whether to take additional action with respect to the object. If it is determined to take additional action with respect to the object, a result of a performance review of the object is received and the power rating of the reviewer is adjusted based on a correlation between the result of the performance review and the first vote and second vote received from the reviewer.

In accordance with still another aspect of the present invention, a method for adjusting a power rating of a reviewer is provided. That method obtains a performance review result for an object and adjusts a results average based on a comparison of the performance review result for the object and an overall voting average. The method also obtains a total voting consistency average for the reviewer, and adjusts the power rating of the reviewer based on the adjusted results average and the total voting consistency average.

In accordance with yet another aspect of the present invention, a reviewer power rating system for rating reviewers of job candidates based on past performance is provided. The system includes voting data of the reviewer for job candidates for whom the reviewer has provided votes, a power rating module for determining a power rating of the reviewer based on an accuracy of past votes for hired job candidates, and a comparison module for comparing the power rating of the reviewer with a power rating of a second reviewer.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 5 illustrates a pictorial diagram of a performance review rating screen 500 that may be used to assess at a subsequent point-in-time the outcome of the decision made based on reviewers' votes cast during the review process, in accordance with an embodiment of the present invention;

FIG. 6 illustrates a pictorial diagram of a total reviewer feedback screen that may be used for providing an overall representation of a reviewer's power and timeliness ratings, in accordance with an embodiment of the present invention;

FIG. 7 illustrates a pictorial diagram of a reviewer statistical feedback screen for representing statistical feedback for each reviewer, in accordance with an embodiment of the present invention;

DETAILED DESCRIPTION OF PREFERRED EMBODIMENTS

Figure 1:
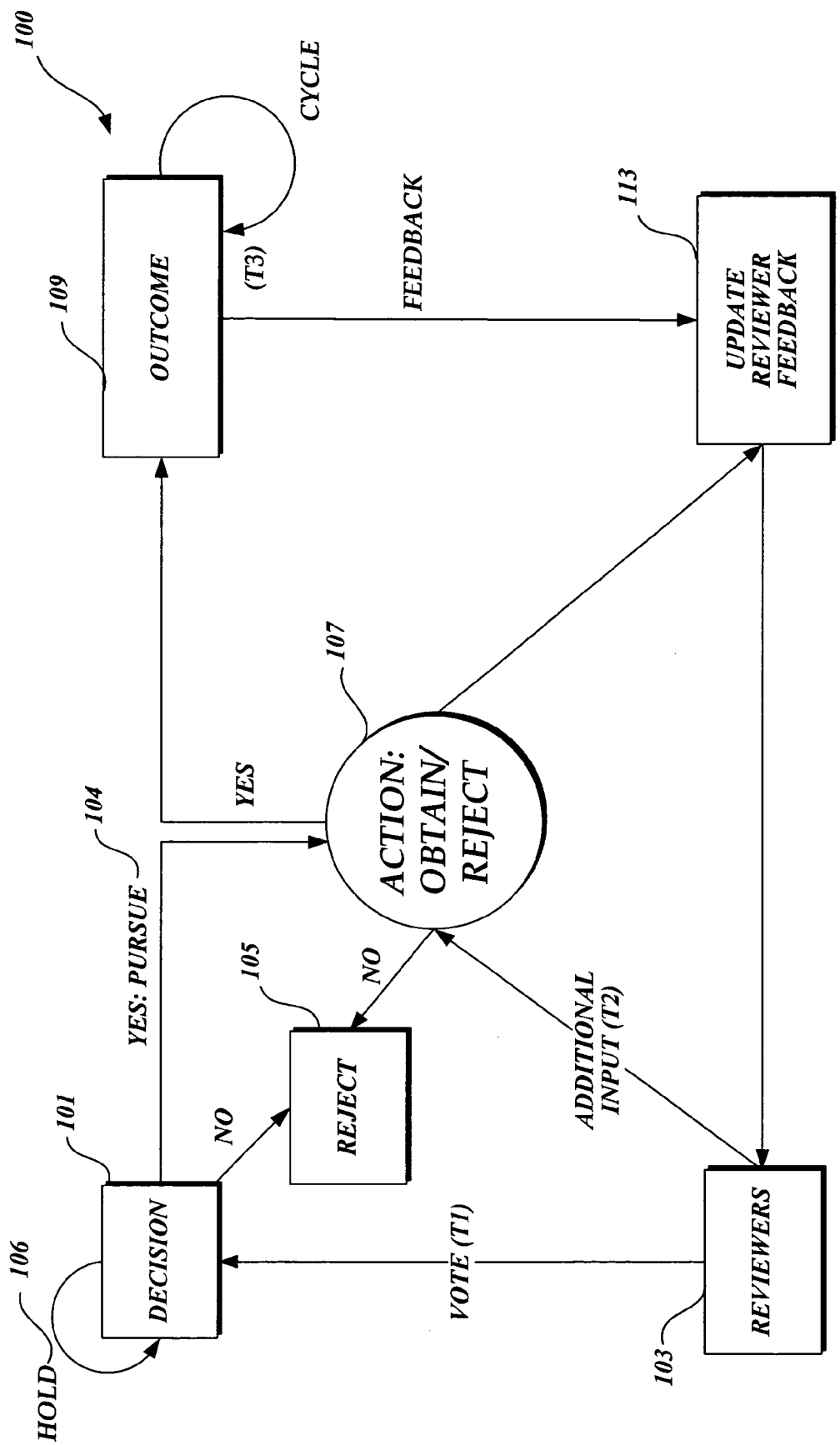
FIG. 1 illustrates a state diagram of a closed loop voting feedback routine for providing reviewer feedback, in accordance with an embodiment of the present invention.

Embodiments of the present invention provide a system and method for providing reviewer feedback identifying a correlation between a reviewer's past votes, other reviewers' votes, and results of the reviewers' votes. The reviewer feedback discussed herein may be based on reviewer votes, the consistency of these votes with respect to other reviewers' votes, and the outcome or results of the reviewer's votes, collected and averaged over time. As the consistency, outcome, and timeliness of a reviewer's past votes are determined, the reviewer may be rated and future votes cast by the reviewer may be weighted based on that rating. A rating of a reviewer is referred to herein as a "power rating" and may be assigned based on a measure of any combination of consistency, results, and timeliness of the reviewer's votes. One measure of consistency described herein that may be used in embodiments of the present invention takes into account other reviewers' voting and, in some embodiments, determines that the present reviewer's vote was consistent if the present reviewer's vote matched that of a majority of the other voters.

Additionally, one measure of results described herein that may be used in embodiments of the present invention takes into account the results of a follow-up review of a decision that was made from the votes cast. If a reviewer is identified as regularly casting votes with respect to decisions made that result in a desired outcome, that reviewer may be assigned a high power rating and his or her vote may be given more weight in future decisions than a reviewer whose votes are statistically less likely to produce a desired outcome. Weighting votes of reviewers potentially increases the likelihood that good decisions will be made as a result of the votes.

As will be described below, a review process may include several stages and reviewers may be requested to provide votes with respect to a decision to be made at each stage of the process. For example, interviewing a job candidate for a job position may be a three-stage process including an initial review of the candidate's resume, a screening interview via telephone, and an in-person interview. At each stage of the process, the reviewers may vote to decide what action to take (e.g., pursue or reject) with respect to the job candidate. If the decision is to pursue and hire the candidate, at a point-in-time after the candidate is hired, a performance review, also referred to herein as a follow-up review, of the candidate may be completed. The results of the performance review may be used to determine a results rating for those who voted on the decision to be made. For example, if the performance review was positive, the results rating for each reviewer will be high. In contrast, if the performance review is negative, the results rating for each reviewer will be low.

At each stage (e.g., initial, screening, interview) of the review process, the timeliness and consistency of the votes may be computed. The timeliness of a vote may indicate whether the vote was received within a predetermined period of time. The consistency of a vote may indicate whether the vote matched the majority of the votes cast by other reviewers at that stage. Additionally, a voting timeliness average and a voting consistency average may be computed at each stage of the review process. The voting timeliness average takes into account past voting timeliness data and indicates the average time a reviewer takes to provide his or her votes at that stage. The voting consistency average takes into account past voting consistency data and indicates the consistency over time of the votes cast by a reviewer at that stage.

A total voting timeliness average and a total voting consistency average may also be computed for each reviewer. The total voting timeliness average indicates the average punctuality over time of all votes cast at all stages of the review process by a reviewer. The total voting consistency average indicates the average over time of the consistency of all votes cast at all stages of a review process by a reviewer with respect to votes cast by other reviewers at those stages.

Additionally, a voting results average may be computed at a point-in-time after the review process has been completed and a decision has been made. The voting results average takes into account the outcome of the decision for which the votes were cast and indicates the average for which a reviewer's votes resulted in a desired outcome. For example, if the decision to be made is whether to hire a job candidate and the job candidate is hired, a performance review of the candidate may be completed at a point-in-time after the candidate is hired. The outcome of the performance review may be used to compute the voting results average. Additionally, a power rating may be assigned to a reviewer based on the total voting consistency average, the total voting timeliness average, voting results average, or any combination thereof.

FIG. 1 illustrates one example of a state diagram of a closed loop voting feedback routine 100 for providing reviewer feedback, in accordance with an embodiment of the present invention. The closed loop voting feedback routine 100 allows a group of reviewers 103 to vote on a decision to be made at different stages of a review process. As discussed above, examples of decisions to be made 101 include, but are not limited to, hiring of job candidates, selecting marketing plans, reviewing invention disclosures, modifying building designs, or any other type of decision upon which individuals may desire to vote. For purposes of this illustration only, the discussion herein will utilize an example of voting on the decision of which job candidate to hire and the reviewers being the interviewers. The review process described herein will be a three-stage review (initial, screening, and interview) of the job candidate and voting will be received from the reviewers at each stage. A voting timeliness average and a voting consistency average will be computed at each stage and a total voting timeliness average, a total voting consistency average, a voting results average, and a power rating will also be computed. As will be appreciated by one of skill in the relevant art, the review process may include any number of stages and voting may be received at each stage or at selective stages.

At an initial stage (T1), the reviewers 103 cast votes on a decision 101 of whether to pursue, reject, or hold an object. For example, the vote may be based on a description of the object. Based on the collective outcome of the votes of the reviewers 103, the decision to pursue 104, reject 105, or hold 106 the object is made. In this example, the object 101 is a job candidate for a job opening at Corporation X and the description is a resume. A group of reviewers 103 (interviewers) review the job candidate's resume and cast votes to decide whether the job candidate is to be pursued 104, rejected 105, or held 106. Other embodiments may include other or additional types of votes and take different or additional types of actions based on those votes.

If the consensus of the votes from the reviewers 103 indicates that the candidate is to be rejected, the job candidate is rejected, as illustrated by block 105. However, if the consensus of the votes from the reviewers 103 indicates that the job candidate is to be pursued, the job candidate is advanced to the next round of reviews and additional review and voting may be performed for that candidate, as indicated by block 107. If the consensus of the votes from the reviewers indicates that the job candidate is to be held 106, the job candidate is neither pursued nor rejected. In such a scenario, the decision of whether to pursue that job candidate may be voted on again at a later point in time.

As described in more detail below, the consistency of each reviewer's vote at each stage of the review process, such as the initial stage described above, may be determined based on the collective decision of whether to pursue, reject, or hold the job candidate. A consistency average for votes cast by each reviewer at each stage of the process, taking into account past voting data for the reviewers, may also be computed. Additionally, a total voting consistency average for each reviewer may be computed for all votes cast at all stages of the review process based on the collective decision at each stage of the review process. As discussed below, consistency averages for a reviewer are calculated over time by determining the consistency of each vote with respect to votes cast by other reviewers, and averaging that consistency.

The voting timeliness of received votes may also be computed for votes received at each stage of the review process. Additionally, a total voting timeliness average may be computed for all votes cast by the reviewer. Similar to the consistency average, the timeliness average is computed over time, based on the timeliness of votes provided by a reviewer.

Returning to the job hiring example as applied to the diagram in FIG. 1, if the collective decision is to pursue the job candidate, at block 107, additional reviews of the job candidate may be performed and additional voting based on those reviews may be received from the reviewers 103, as illustrated by additional input (T2). For example, the reviewers 103 may conduct a telephone interview of the candidate and/or an in-person interview. Reviews may also be performed on objects other than job candidates. For example, if a decision is being made with respect to a marketing plan, a first group of reviewers may elect a marketing plan that is then reviewed and decided upon by another group of reviewers, such as management.

At each stage of the review process, the closed loop voting feedback routine 100 calculates and provides feedback 113 on the votes provided by the reviewers 103. As discussed below, such feedback may include, but is not limited to, the overall timeliness of a reviewer in voting on objects at each stage of the review process, and the overall consistency of a reviewer with respect to other reviewers in deciding whether to pursue an object.

In addition to evaluating overall timeliness and consistency, the routine 100 may also provide consistency and timeliness reports at each stage of the routine 100 based on the consistency and timeliness of individual reviewer votes. Continuing with the foregoing example, a measure of consistency and timeliness of each reviewer's vote may be calculated and a report provided. In one embodiment, the calculated consistency identifies whether a reviewer's vote was consistent with the consensus decision of the group of reviewers to pursue or reject the candidate at that stage in the interview process. If the candidate is pursued, a reviewer's vote to pursue the candidate would be considered a consistent vote. The calculated timeliness indicates how timely the reviewer was in providing his or her vote on the decision to be made.

In addition to providing reviewers with overall feedback and feedback with respect to other reviewers at each stage of a review process, the closed loop voting feedback routine 100 may also provide reviewer feedback with respect to the decision that is ultimately made as a result of the review process. For example, if the ultimate decision to be made is whether to obtain an object and the object is obtained, at a point-in-time after the object is obtained, a performance review of that object is performed, as illustrated by block 109. For the foregoing example, if a job candidate is hired, a performance review of that candidate may be performed six months or one year, or other such time as appropriate, after that candidate begins employment. Such a review may provide a performance report of the employee that was previously the job candidate. Based on the outcome of the performance review of the candidate, a results average for each of the reviewers 103 who voted on the candidate is updated, as illustrated by block 113.

For example, if a hired candidate scored a "4" on a scale of 1-5 (5 being the highest) on a performance review, each reviewer 103 who gave a positive vote to pursue the candidate may have his or her voting results average and his or her power rating (described below) increased at block 113 to reflect that his or her votes resulted in a desired outcome—the hiring of what has become a good employee. Alternatively, if the hired candidate scored a "1" on the performance review, each reviewer 103 who voted to hire the candidate may have his or her voting results average and power rating downgraded at block 113, illustrating that his or her votes resulted in an undesired outcome—the hiring of a bad employee.

The consistency, timeliness, and/or result averages of a reviewer may also be used to compute a power rating for a reviewer. In one exemplary embodiment, a power rating is a ranking for a reviewer indicating, based on that reviewer's past voting record, the potential that the reviewer will continue to make decisions that result in a desired outcome. The power rating of reviewers may be used to weight votes, thereby increasing the likelihood that decisions resulting in a desired outcome will be made with respect to future voting decisions.

Providing reviewer feedback informs reviewers of the consistency of their judgment at each stage of the review process compared to other reviewers, and the results of their hiring decisions, based on the performance of the hired candidate. Such information is also beneficial to management personnel and others who have an interest in hiring the best job candidates in a quick and efficient manner. In this example, identifying reviewers who are consistent, timely, and produce desired results (e.g., the hiring of good employees) reduces the amount of employee time taken to interview job candidates and potentially results in better selection of candidates for job openings. Assigning a power rating to a reviewer facilitates a comparison of reviewers, which may have an effect on reviewers to increase their timeliness and results. Additionally, a power rating may be used to weight votes cast by reviewers to further increase the potential that better decisions will be made with respect to a decision to be made.

Figure 2:
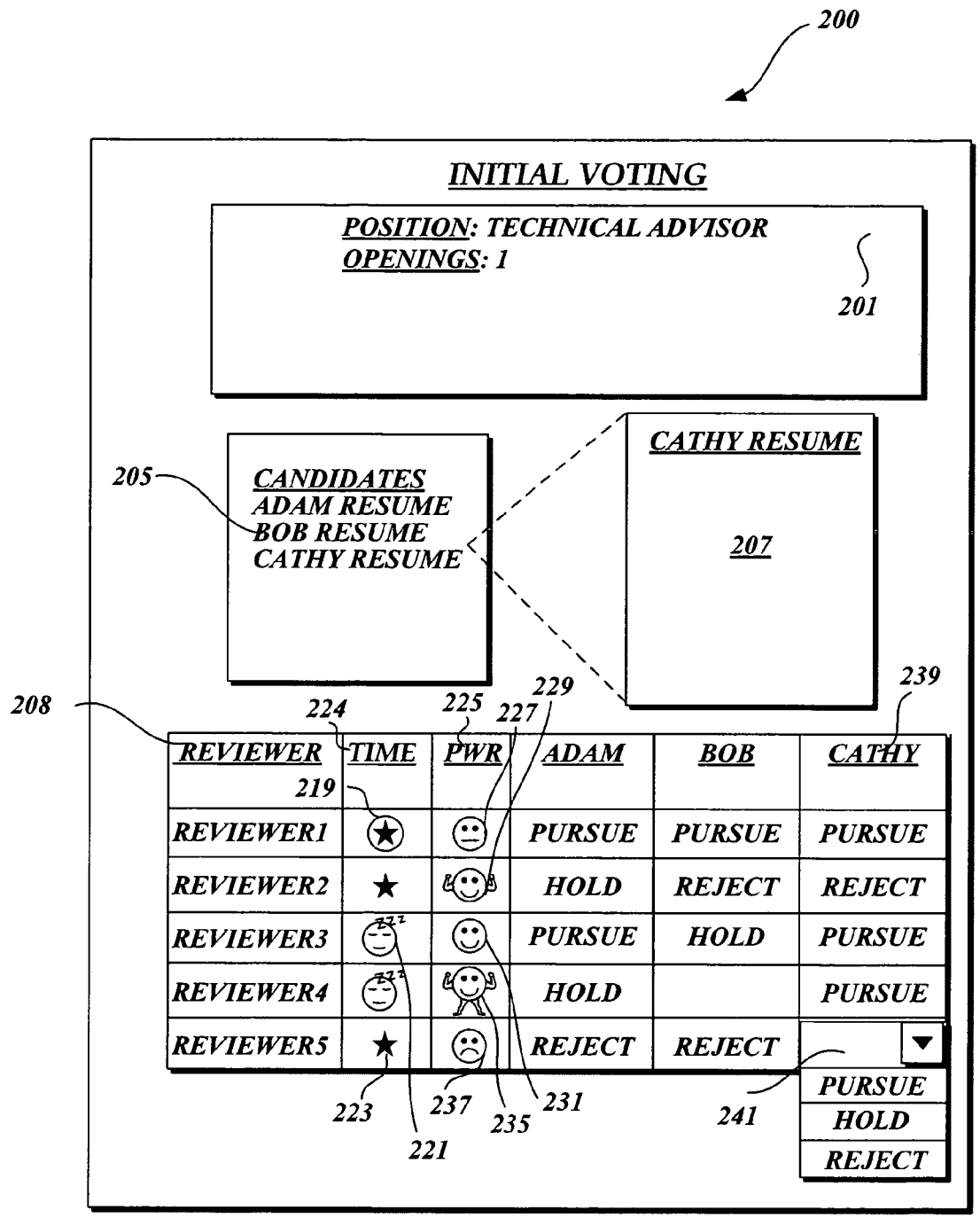
FIG. 2 illustrates a pictorial diagram of an initial voting screen that may be used with a closed loop voting feedback routine for allowing reviewers to initially vote on an object, in accordance with an embodiment of the present invention.

FIG. 2 illustrates a pictorial diagram of an initial voting screen 200 that may be used with a voting feedback routine, such as the closed loop voting feedback routine 100 shown in FIG. 1. The initial voting screen 200 allows reviewers to initially vote on a decision to be made, in accordance with an embodiment of the present invention. Continuing with the example of a hiring process, the initial voting screen 200 allows a group of reviewers 208, such as Reviewer1, Reviewer2, Reviewer3, Reviewer4, and Reviewer5, to vote on a group of candidates 205 for the position of technical advisor 201. Utilizing the initial voting screen 200, a reviewer, such as Reviewer5, may review and vote on the decision of whether to pursue, reject, or hold each of the candidates 205 for the position of technical advisor 201. In particular, Reviewer5 (or any of the other reviewers) may access additional information about each of the candidates 205, such as a resume 207, by selecting a candidate's name from the list of candidates 205. For each candidate for the position of technical advisor 201, a reviewer 208 may cast a vote by selecting from a list of decision options 241, such as pursue, hold, or reject. Based on a consensus of all of the reviewers' votes for the candidates, a decision is made whether to pursue each of the candidates for further consideration of the position of technical advisor 201.

The initial voting screen 200 may be configured to represent to each reviewer the votes cast by other reviewers, to only indicate whether a vote has been cast by other reviewers, or to only identify the other reviewers but not indicate whether a vote has been cast or what the vote cast was. Alternatively, the initial voting screen 200 may be configured to selectively display items to ensure that the voting behavior of reviewers is not affected by other reviewers. For example, the initial voting screen 200 may be configured to only represent to a reviewer the votes cast by other reviewers after the reviewer has cast his or her own vote. As will be appreciated by one of skill in the relevant art, the initial voting screen 200 may be configured in any format and the above are for illustration purposes only.

The initial voting screen 200 may also provide information about each of the reviewers 208. For example, graphical icons may be presented indicating the timeliness 224 of reviewers and/or the power rating 225 of reviewers. As described in more detail below, the timeliness and power rating may be computed over time based on a total number votes cast by the reviewer, the timeliness of those votes, the consistency of those votes compared to other voters, and the results produced from the decisions made from those votes. Timeliness graphical icons may include, but are not limited to, a star enclosed in a circle 219, identifying that a reviewer, such as Reviewer1, is generally timely; a sleepy-face icon 221, indicating that a reviewer, such as Reviewer3 and Reviewer4, are generally not timely in providing votes; and a star icon 223, indicating that a reviewer, such as Reviewer2 and Reviewer5, are frequently timely in voting.

Graphical icons representing the power rating of reviewers may include, but are not limited to, a smiley-face with arms and legs 235, indicating that a reviewer, such as Reviewer4, is very good at making decisions that result in a desired outcome; a frowning-face icon 237, indicating that a reviewer, such as Reviewer5, is bad at making decisions; a smiley-face icon 231, indicating that a reviewer, such as Reviewer3, is frequently good at making decisions; a smiley face with arms icon 229, indicating that a reviewer, such as Reviewer2, even more so than Reviewer3, is good at making decisions that result in a desired outcome; and a face icon with neither a smile or a frown 227, indicating that a reviewer, such as Reviewer1, is better than Reviewer5, but not as good as Reviewer3, in making decisions that result in a desired outcome. As will be described in more detail below, the power rating of each of the reviewers may be used to weight the future votes cast by the reviewers in making decisions.

As will be appreciated by one of skill in the relevant art, any type of graphical representations or other indicators may be utilized to identify the timeliness and power rating of reviewers. The face and star icons are provided as examples only. As an alterative, the timeliness and power ratings of reviewers may be represented numerically by assigning a score or other numerical rating to the timeliness and power ratings or reviewers.

As votes are cast for the candidates 205, the closed loop voting feedback routine determines the timeliness of those votes. In one exemplary embodiment, the timeliness of a vote indicates whether the vote was cast within a predetermined period of time. If the vote was not timely cast, the timeliness data may further indicate how late the vote was cast with respect to the predetermined time. Using the timeliness of the current initial candidate votes and the timeliness of past initial candidate votes cast by those reviewers, an initial voting timeliness average may be computed for each reviewer. A total voting timeliness average may also be computed for each reviewer by averaging the timeliness average computed at each stage of the review process. This total voting timeliness average may be represented by the timeliness graphical icons, such as those discussed with respect to icons 219, 221, and 223 of FIG. 2. Alternatively, the timeliness average at each particular stage may be represented by timeliness icons on each respective voting screen. For example, referring to FIG. 2, the timeliness icons 219, 221, 223 may be used to graphically represent the total voting timeliness average of the respective reviewers or, alternatively, represent the initial voting timeliness average of the respective reviewers, at the initial stage.

In addition to computing an initial voting timeliness average and a total voting timeliness average for each reviewer, once all votes are cast at the initial stage, the closed loop voting feedback routine may compute each reviewer's initial voting consistency average and total voting consistency average. An initial voting consistency average may be computed for each reviewer by comparing that reviewer's vote to the consensus decision made at the initial stage (as to whether to pursue the candidate, in this example). If the reviewer's vote matches that of the decision made, the reviewer's vote is considered "consistent." The consistency of the reviewer's vote at this stage may be averaged with the consistency of past votes cast by the reviewer at the initial stage. For example, in FIG. 2, Reviewer2 voted to reject candidate Cathy 239. However, the consensus of the votes indicated that Cathy 239 was to be pursued. Thus, Reviewer2 provided an "inconsistent" vote at the initial voting stage. That inconsistent vote is averaged with the consistency of past votes cast by Reviewer2 at the initial voting stage. While Reviewer2's vote is considered inconsistent with respect to other reviewers' votes at this stage, as discussed below, if Cathy is hired and ultimately proves to be a bad hiring decision (e.g., she performs poorly), Reviewer2 may have his or her voting results average increased for being correct in voting not to hire Cathy. Such an adjustment to the reviewer's voting results average may be determined at the time of or after a follow-up review of the decision that is ultimately made (here, a performance review of Cathy) as indicated at blocks 109 and 113 in FIG. 1.

Similar to the initial voting consistency average, a total voting consistency average for a reviewer may be computed by averaging the initial voting consistency average of the reviewer with the reviewer's consistency averages for all stages of the review process.

Figure 3:
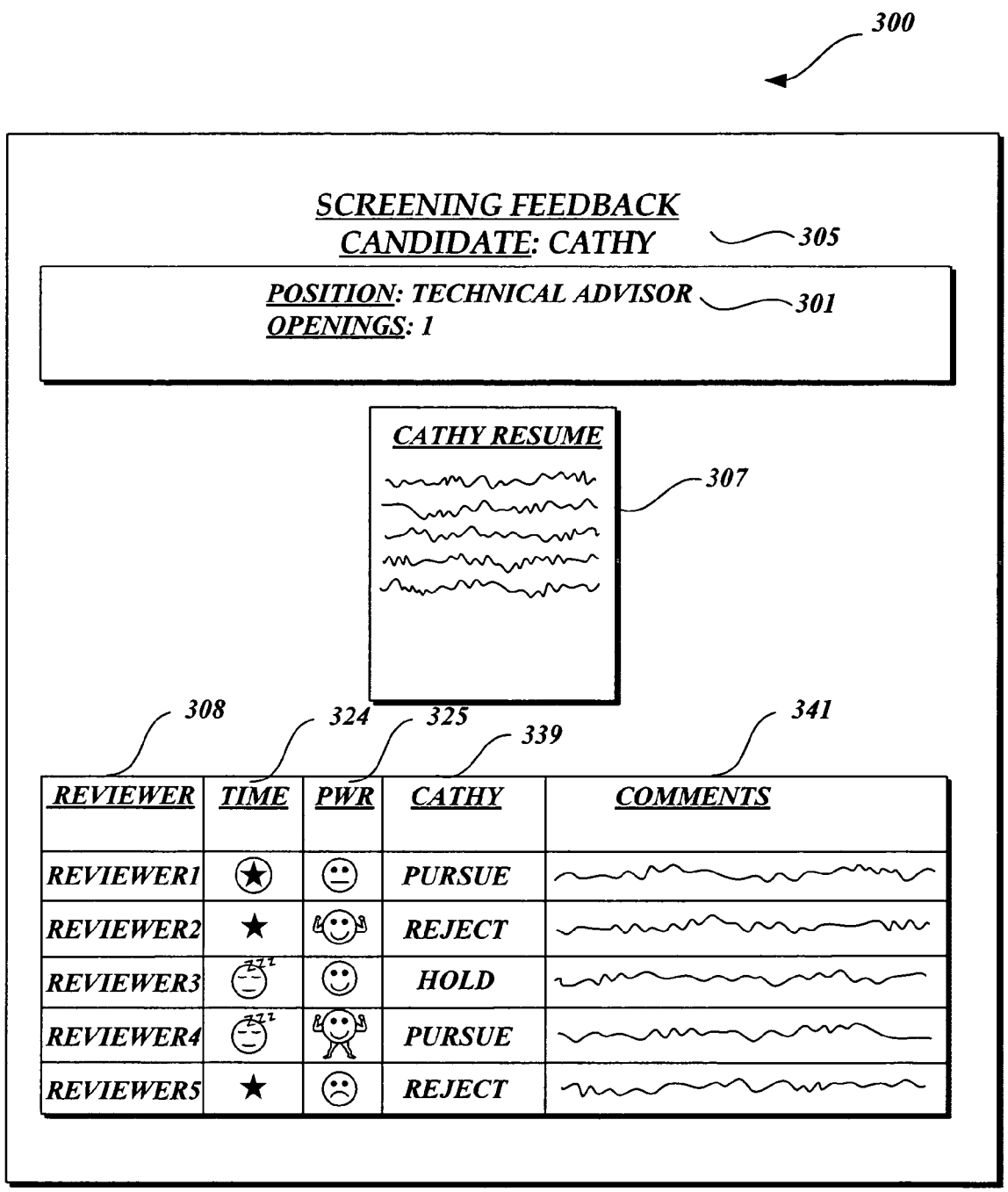
FIG. 3 illustrates a pictorial diagram of a screening feedback screen that can be used with a closed loop voting feedback routine for providing feedback on further review of a pursued object that has not yet been obtained, in accordance with an embodiment of the present invention.

FIG. 3 illustrates a pictorial diagram of a screening feedback screen 300 that can be used with a closed loop voting feedback routine for providing feedback on further review of a pursued object that has not yet been obtained, in accordance with an embodiment of the present invention. Continuing with the example of evaluating a job candidate, the screening feedback screen 300 is used to receive votes and provide feedback in response to additional reviews of the pursued candidate Cathy 305. The screening feedback screen 300 allows each of the reviewers 308 to submit votes 339 and comments 341 with respect to a second review, for example, a telephone interview, of the candidate Cathy 305. Additionally, as discussed with respect to FIG. 2, each of the reviewers 308 has associated with that reviewer's name graphical icons representing the voting timeliness 324 and the power rating 325 of that reviewer.

The screening feedback screen 300 may be configured to represent to each reviewer the votes cast by other reviewers, to only indicate whether votes have been cast by other reviewers or to only identify the other reviewers but not indicate whether a vote has been cast or the nature of the cast vote. Alternatively, the screening feedback screen 300 may be configured to selectively display items to ensure that the voting behavior of reviewers is not affected by other reviewers. For example, the screening feedback screen 300 may be configured to only represent to a reviewer the votes cast by other reviewers after the reviewer has cast his or her own vote. As will be appreciated by one of skill in the relevant art, the screening feedback screen 300 may be configured in any format. The above discussion and screen layout are provided for illustration purposes only.

As the votes are cast for the decision of whether to pursue candidate Cathy 305 during the screening stage of the review process, the closed loop voting feedback routine determines the timeliness of those votes. Using the timeliness of the currently cast votes and using the timeliness for past screening votes cast by the reviewers, a screening voting timeliness average may be computed for each reviewer. Additionally, a total voting timeliness average for each reviewer may be computed to account for the newly-computed screening vote timeliness average.

In addition to computing a screening voting timeliness average and a total voting timeliness average for each reviewer, once all votes are cast at the screening stage, the closed loop voting feedback routine may compute each reviewer's screening voting consistency average. The screening voting consistency average is computed for each reviewer by comparing that reviewer's vote at the screening stage to the consensus decision made at that stage as to whether to pursue the candidate. If the reviewer's vote matches that of the decision made, the reviewer's vote is considered "consistent." The consistency of the reviewer's screening vote may then be averaged with the consistency of past votes cast by the reviewer at the screening stage. Additionally, the total voting consistency average of the reviewer may be computed to account for the newly-computed screening voting consistency average.

Figure 4:
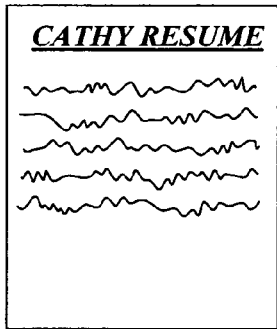
FIG. 4 illustrates a pictorial diagram of an interview feedback screen that may be used to provide additional feedback on a reviewer's evaluation of an object that is being pursued, in accordance with an embodiment of the present invention.

FIG. 4 illustrates a pictorial diagram of an interview feedback screen 400 that may be used to provide additional feedback on a reviewer's evaluation of an object that is being pursued, in accordance with an embodiment of the present invention. Continuing with the previous example, assuming that job candidate Cathy 405 was voted at the screening stage (FIG. 3) to continue through the interview process (FIG. 4), and job candidate Cathy 405 was brought in for an in-person interview with the reviewers 408, those reviewers 408 would be able to provide additional voting 439 with respect to the decision to be made regarding candidate Cathy 405 (i.e., whether to hire Cathy) and provide comments 441 using the interview feedback screen 400. If, for example, following an in-person interview, Reviewer1 decided to vote to reject job candidate Cathy 405 for the position of technical advisor 401, Reviewer1 may cast his or her vote to reject Cathy 405 as indicated at reference numeral 450. Additionally, the interview feedback screen 400 presents graphical icons representing both the timeliness 424 and power rating 425 of each reviewer 408.

As with the feedback screens previously described, the interview feedback screen 400 may be configured to represent to each reviewer the votes cast by other reviewers, to only indicate whether votes have been cast by other reviewers, or to only identify the other reviewers but not indicate whether a vote has been cast or the nature of the cast vote. Alternatively, the interview feedback screen 400 may be configured to selectively display items to ensure that the voting behavior of reviewers is not affected by other reviewers. For example, the screening feedback screen 400 may be configured to only represent to a reviewer the votes cast by other reviewers after the reviewer has cast his or her own vote. As will be appreciated by one of skill in the relevant art, the interview feedback screen 400 may be configured in any format and the above discussion and screen layout are provided for illustration purposes only.

As the votes are cast for candidate Cathy 405, the closed loop voting feedback routine determines the timeliness of those votes. Using the timeliness of each reviewer's currently cast vote and the timeliness for past interview votes cast by the reviewer, an interview voting timeliness average may be computed for each reviewer. Additionally, a total voting timeliness average may be computed to account for the newly-computed interview voting timeliness average.

In addition to computing an interview voting timeliness average and a total voting timeliness average for each reviewer, once all votes are cast at the interview stage, the closed loop voting feedback routine may compute each reviewer's interview voting consistency average. The interview voting consistency average is computed for each reviewer by comparing that reviewer's vote at the interview stage to the final decision made by the group of reviewers as to whether to hire the candidate. If the reviewer's vote matches that of the group decision being made, the reviewer's vote is considered "consistent." The consistency of the reviewer's interview vote may then be averaged with the consistency of past votes cast by the reviewer at the interview stage. Additionally, the total voting consistency average may be computed to account for the newly-computed interview voting consistency average.

Assuming that the consensus of the votes collected in the interview feedback screen 400 from each of the reviewers 408 was to hire job candidate Cathy 405 for the position of technical advisor 401, then a job offer for the position of technical advisor would be presented to candidate Cathy 405.

FIG. 5 illustrates a pictorial diagram of a performance review rating screen 500 that may be used to assess at a subsequent point-in-time the outcome of the decision made based on reviewers' votes cast during the review process, in accordance with an embodiment of the present invention. Continuing with the previous example, assuming job candidate Cathy was offered the position of technical advisor and accepted that position, at a point-in-time after Cathy began her employment, a performance review would be conducted. Such a review may determine how well Cathy 505 is performing her duties in the position of technical advisor 501. Based on an employee rating generated as a result of the performance review, which may be represented numerically in this example, a voting results average may be computed for each reviewer. Additionally, the power rating of the reviewers that voted on Cathy may be adjusted based on the voting results average.

As an example, assume Cathy 505 was hired on Nov. 13, 2003, and a performance review was conducted on Nov. 13, 2004 with respect to her performance as a technical advisor 501 and the outcome 503 of that performance review was a "1" on a scale of 1 to 5, with 5 being the highest and 1 being the lowest. Based on the voting decisions of each of the reviewers 508, their voting results averages may be adjusted. For example, Reviewer4, at each of the stages of the hiring process, voted to advance and eventually hire Cathy for the position of technical advisor 501. Based on those votes, an overall voting average may be computed to indicate that Reviewer4's overall vote was to pursue and hire Cathy 505. However, because Cathy's employee rating is a 1, the lowest possible score for an employee rating, Reviewer4's voting results average and power rating 525 may decrease. As a result of that decrease, Reviewer4 may transition from being the most powerful reviewer in the group, as was illustrated by graphical icon 235 (FIG. 2), to the second most powerful reviewer in the group, as illustrated by graphical icon 535 (FIG. 5).

Similarly, Reviewer2 consistently voted to reject Cathy 505 for the position of technical advisor 501 and, based on those votes, an overall voting average may be computed to indicate that Reviewer2's overall vote was to reject Cathy. Because Reviewer2's voting indicated that Cathy should not have been hired for the position of technical advisor, and Cathy's performance review resulted in a low rating, Reviewer2's voting results average and power rating 525 may increase. As a result of that increase, Reviewer2 may transition from being the second most powerful reviewer in the group, as was represented by graphical icon 229 (FIG. 2), to being the most powerful reviewer in the group, as represented by graphical icon 529 (FIG. 5).

As can be seen from each of the screens, such as the initial voting screen 200, screening feedback screen 300, interview feedback screen 400, and follow-up employee rating screen 500, each of the reviewers that reviewed job candidate Cathy may graphically view each other's power rating and voting timeliness. Such graphical representations may provide an incentive to the reviewers to be on time and to cast votes that produce a desired outcome as often as possible.

FIG. 6 illustrates a pictorial diagram of a total reviewer feedback screen 600 that may be used for providing an overall representation of a reviewer's power and timeliness ratings, in accordance with an embodiment of the present invention. The total reviewer feedback screen 600 graphically represents for each reviewer 608 the total voting timeliness average 624 of all votes cast by that reviewer over time. Likewise, a graphical representation of each reviewer's power rating 625 over time is displayed. A remarks section 627 providing any additional comments with respect to each of the reviewers 608 may also be included.

FIG. 7 illustrates a pictorial diagram of a reviewer statistical feedback screen for representing statistical feedback for each reviewer, in accordance with an embodiment of the present invention. In particular, the statistical feedback screen 700 identifies each reviewer 708, each reviewer's total voting consistency average 701, each reviewer's total voting timeliness average 703, each reviewer's results average 704, and each reviewer's power rating 733. As illustrated, the power rating of the reviewers is based on an ordering/ranking of the reviewers with respect to one another. In particular, the reviewers are ranked based on how likely that reviewer is, compared to the other reviewers, in casting votes that result in a desired outcome. In an alternative embodiment, the power rating may be a numerically calculated value that is generated based on the likelihood that the reviewer will cast votes that result in a desired outcome. In such an embodiment, more than one reviewer may have the same numerical value.

Additional information regarding each reviewer 708 may also be presented via the statistical feedback screen 700. For example, the screen 700 may illustrate for each reviewer a total number of initial votes 705, a positive initial vote rate 707 for those votes, the consistency average of those initial votes 709, and the initial voting timeliness average 711 for those votes.

The initial votes 705 reflect the number of votes provided in response to an initial review at the beginning of the closed loop voting feedback routine. The positive initial vote rating 707 for those votes indicates the number of votes cast by a reviewer to pursue a candidate. For example, Reviewer1 voted to pursue 100% of the 100 candidates on which he or she voted at the initial stage. In contrast, Reviewer2 only voted to pursue 36% of the 250 candidates on which he or she voted at the initial stage. The initial consistency average 709 indicates the consistency of those votes cast compared to votes from the other reviewers at the initial stage. For example, even though Reviewer1 voted to pursue 100% of the 100 candidates on which that reviewer voted, only 20% of those candidates were actually pursued. The initial voting timeliness average 711 illustrates the average rate that each reviewer cast his or her initial vote for a candidate in a predetermined time period of the initial review.

Also illustrated in the statistical feedback screen 700 is the number of screening votes 713 cast by reviewers 708 in response to screenings of candidates, the positive screened vote rate for those votes 715, the consistency average of those votes 717, and the screened timeliness average 719 for those votes. As with the initial votes, the screening votes 713 indicate the number of votes cast by reviewers 708 in response to screenings of a pursued candidate. Similarly, the positive screening review rate 715 illustrates the percentage of the screening votes 713 that were cast by the reviewer to pursue the candidate. The screening consistency average 717 indicates the average consistency of those votes with respect to votes other reviewers cast for the same candidate in the screening stage. The screening voting timeliness average 719 indicates the average timeliness with which the screening votes 713 were cast by each of the reviewers 708.

Also shown in the statistical feedback screen 700 for each of the reviewers 708 is the total number of interview votes 721 cast in response to interviews of candidates, the positive interview review rate 723 for those votes, the consistency average of those votes 725, and the interview voting timeliness average 727 for those votes. Still further, the statistical feedback screen 700 illustrates the total number of offers accepted 729 that correspond with the candidates reviewed and voted on by each of the reviewers 708.

Figure 8:
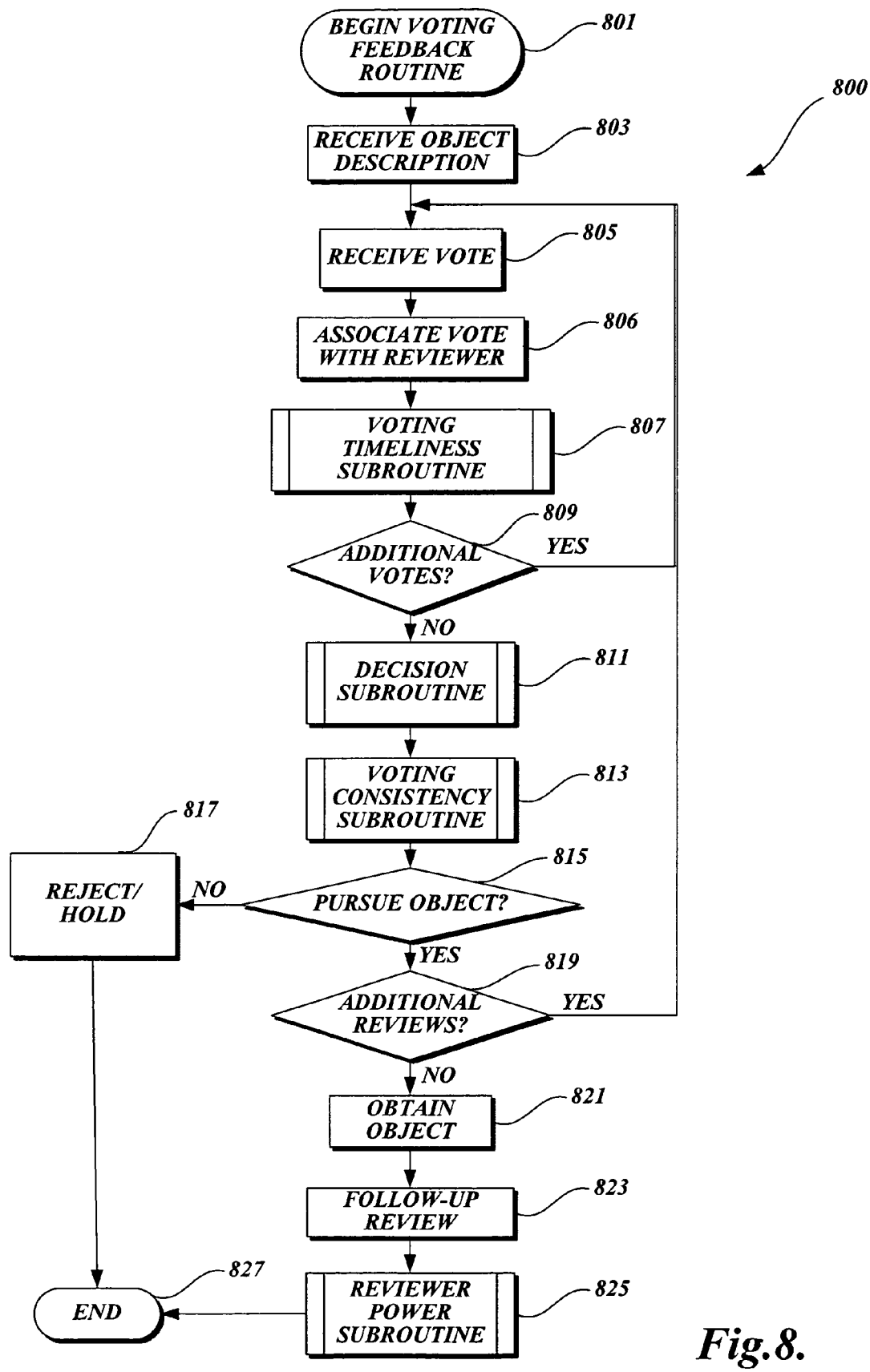
FIG. 8 illustrates a flow diagram of a closed loop voting feedback routine, in accordance with an embodiment of the present invention.

FIG. 8 illustrates a flow diagram of a closed loop voting feedback routine for generating feedback in response to a decision to be made with respect to an object, in accordance with an embodiment of the present invention. The closed loop voting feedback routine 800 begins at block 801 and at block 803 an object or a description of an object is received for which the voting feedback routine is to be performed. A description of an object may be, but is not limited to, a resume of a job candidate, a description of an object to be acquired, a marketing strategy, an invention disclosure, or anything else for which a decision may be made by voting. At block 805, a vote is obtained and at block 806 that vote is associated with the reviewer or individual that cast the vote. At block 807, a voting timeliness subroutine is performed to compute a voting timeliness average for that stage of voting and a total voting timeliness average for all votes cast by that reviewer, as will be described in more detail with respect to FIG. 9.

After receipt of a vote and completion of the voting timeliness subroutine 807, at decision block 809 a determination is made as to whether additional votes are to be received. If it is determined at decision block 809 that additional votes are to be received, the routine 800 returns to block 805 and the process continues. However, if it is determined at decision block 809 that additional votes are not to be received, at subroutine block 811, a decision subroutine is performed. As will be described in more detail with respect to FIG. 10, the decision subroutine 811 compiles all the votes received at a particular stage of the review for the object being reviewed and returns a group decision based on the votes as to what action to take with respect to the object. For purposes of illustration only, the actions discussed herein are pursue, reject, and hold. However, as will be appreciated by one of skill in the relevant art, additional, fewer, or different actions may be decided upon and taken with respect to an object.

The power rating of the reviewers who cast the votes as to whether to pursue the object being reviewed may also be taken into consideration when weighting the reviewers' votes and making a determination as to whether to pursue the object.

Upon completion of the decision subroutine 811, the voting consistency subroutine 813 is performed to compute a voting consistency average for the vote at that stage and a total voting consistency average for all votes cast by the associated reviewer. The voting consistency subroutine 813 is described in more detail with respect to FIG. 11. At decision block 815, based on the results returned from the decision subroutine 811, a determination is made as to whether to continue to pursue the object being reviewed. If it is determined at decision block 815 that the object is not to be pursued, the object is rejected or held, as illustrated by block 817. As discussed above, the object may be held and voted on again later or rejected and removed from the process. However, if it is determined at decision block 815 to pursue the object, at decision block 819 a determination is made as to whether additional reviews of that object are to be performed.

For example, as described above, if the object is a job candidate and a group decision is made based on initial votes to pursue that candidate, additional reviews may include a telephone screening and/or an in-person interview of that candidate. If it is determined at decision block 819 that additional reviews of the object are to be performed, the routine 800 returns to block 805 and receives votes from reviewers as they complete those additional reviews.

Referring back to decision block 819, if it is determined that no additional reviews are to be performed, and the object has not been rejected or held (block 817), the object is obtained. For objects that are obtained, at some point in time after the object has been obtained, a follow-up performance review is performed with respect to that object, as illustrated by block 823. For example, if a job candidate is hired, a job performance review of that candidate may be performed at a point-in-time after the candidate begins their employment (e.g., one year after their hire date). Upon completion of the performance review 823, a reviewer power subroutine 825 is performed to compute the voting results average of the reviewers' voting based on the results of the performance review of the obtained object and to compute the power rating for the reviewer. The reviewer power subroutine 825 is described in more detail with respect to FIG. 12. Upon completion of the reviewer power subroutine at block 825, or after the object is rejected or held at block 817, the closed loop voting feedback routine 800 completes at block 827.

Figure 9:
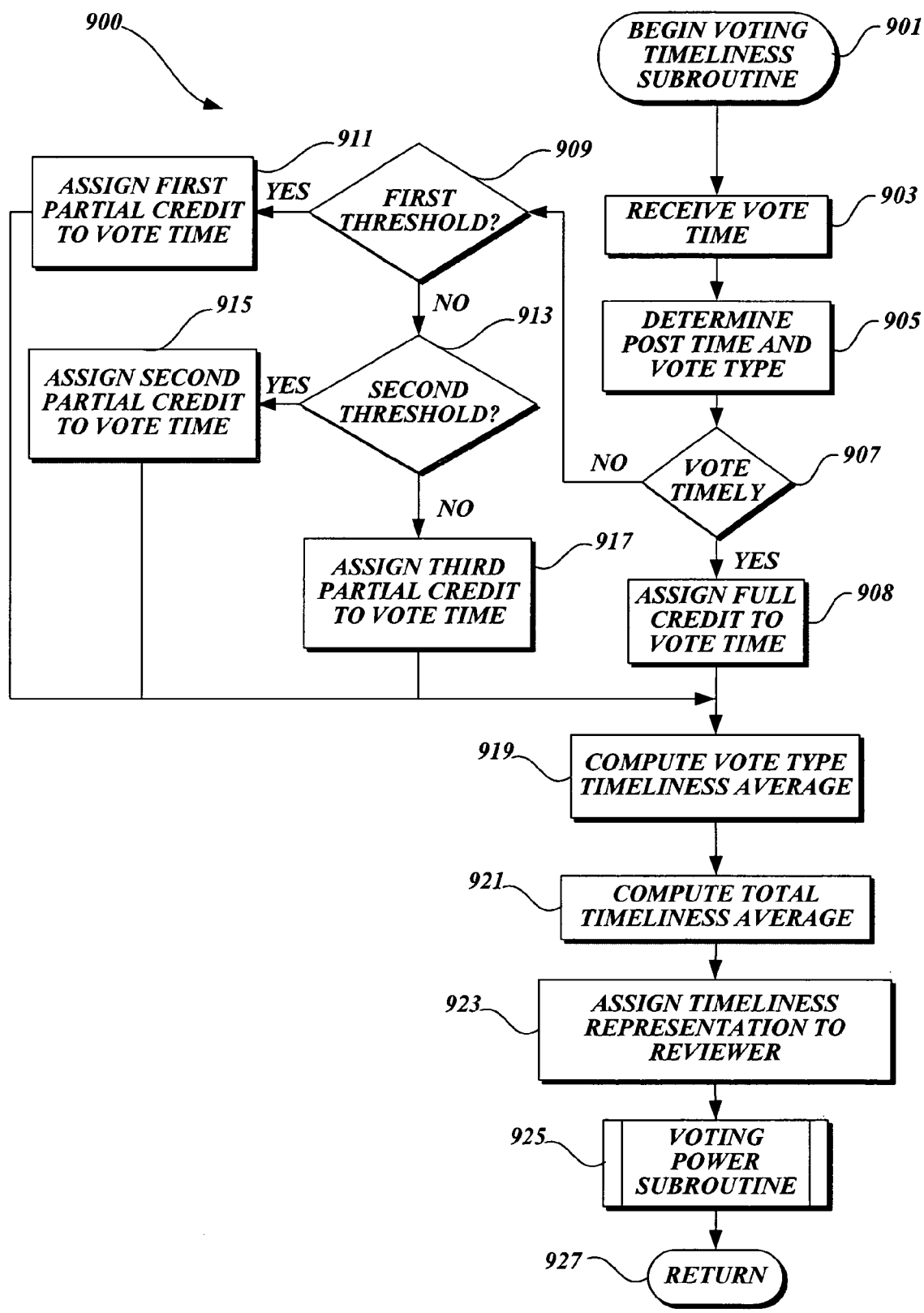
FIG. 9 illustrates a flow diagram of a reviewer timeliness subroutine for computing a timeliness average of a reviewer, in accordance with an embodiment of the present invention.

FIG. 9 illustrates a flow diagram of a voting timeliness subroutine 900 for computing a voting timeliness average of a reviewer, in accordance with an embodiment of the present invention. Voting timeliness subroutine 900, as referenced above with respect to block 807 (FIG. 8) performs the task of calculating the timeliness averages of a reviewer's vote casting over a period of time. The voting timeliness subroutine 900 begins at block 901 and at block 903 a vote time is received for a vote that has been cast in the voting feedback routine 800. At block 905, a post time and vote type for the received vote are determined. The post time identifies the time that the vote was to be received. The vote type identifies the stage of the process for which the vote is received (e.g., initial, screening, interview). As discussed above, votes may be received at different stages of the review process if the object is reviewed more than once.

At decision block 907 a determination is made as to whether a reviewer's vote was timely received by comparing the time that the vote was actually received with the requested post time. If it is determined at decision block 907 that the vote was timely, full credit is assigned to the vote time. However, if it determined at decision block 907 that the vote was not timely, at decision block 909, a determination is made as to whether the vote was provided within a first threshold level. A first threshold level may be a predetermined time period after the requested post time (e.g., one day). If the vote was received within the first threshold, a first partial credit is assigned to the vote time, as illustrated by block 911. For example, if the vote is received within the first threshold, 75% of full credit may be assigned to the vote time.

If it is determined that the vote was not provided within that first threshold, at decision block 913, a determination is made as to whether the vote was provided within a second threshold (e.g., two days after post time). If it is determined at decision block 913 that the vote was provided within the second threshold, a second partial credit is assigned to the vote time, as illustrated by block 915. However, if it is determined at decision block 913 that the vote was not received within the second threshold, at block 917 a third partial credit is assigned to the vote time. The third partial credit may be a minimum credit given to the vote time illustrating that the vote was substantially late, but at least provided.

At block 919, a vote type timeliness average is computed. As discussed above, the vote type timeliness average provides an average for all votes cast by the reviewer for that particular vote type. For example, if a reviewer had cast 100 votes in response to initial reviews of object descriptions, and 50 of those were timely, 25 were within the first threshold, 20 were within the second threshold, and 5 were after the second threshold, an initial voting timeliness average may be computed. Assuming that full credit is 100 out of 100, a first partial credit is 75 out of 100, a second partial credit is 50 out of 100, and a third partial credit is 25 out of 100, the initial voting timeliness average would be 80%. Likewise, if a reviewer cast 50 votes in response to screening reviews and 40 of those votes were timely, 5 were within the first threshold, and 5 were within the second threshold, the screening voting timeliness average would be 92.5%.

At block 921, a total voting timeliness average is computed for all votes cast by a reviewer, regardless of vote type. Continuing with the above example, the total voting timeliness average may be computed by averaging the initial voting timeliness average (80%) and the screening voting timeliness average (92.5%), resulting in a total voting timeliness average of 86.25%. Additionally, in an embodiment of the present invention, the timeliness of one vote type may be given a greater weight in computing the total voting timeliness average at block 921. For example, because the actual screening process potentially takes longer to complete, thereby requiring additional employee hours, the timeliness of the screening votes may be more important than the timeliness of the initial votes. Thus, the screening voting timeliness average may be given a greater weight than the initial voting timeliness average in computing the total voting timeliness average.

Based on the computed total voting timeliness average, at block 923 a graphical timeliness representation may be assigned to the reviewer, as illustrated in FIGS. 2-6. For example, a reviewer may be assigned a graphical icon that is displayed next to that reviewer's name illustrating the degree to which the reviewer has been timely in providing his votes.

At block 925, the reviewer power subroutine described below with respect to FIG. 12 may be performed. As will be appreciated by one of skill in the art, the reviewer power subroutine 925 may or may not be performed at completion of the reviewer timeliness subroutine 900. At block 927, the reviewer timeliness subroutine 900 completes, returning control to the reviewer feedback routine 800 (FIG. 8).

Figure 10:
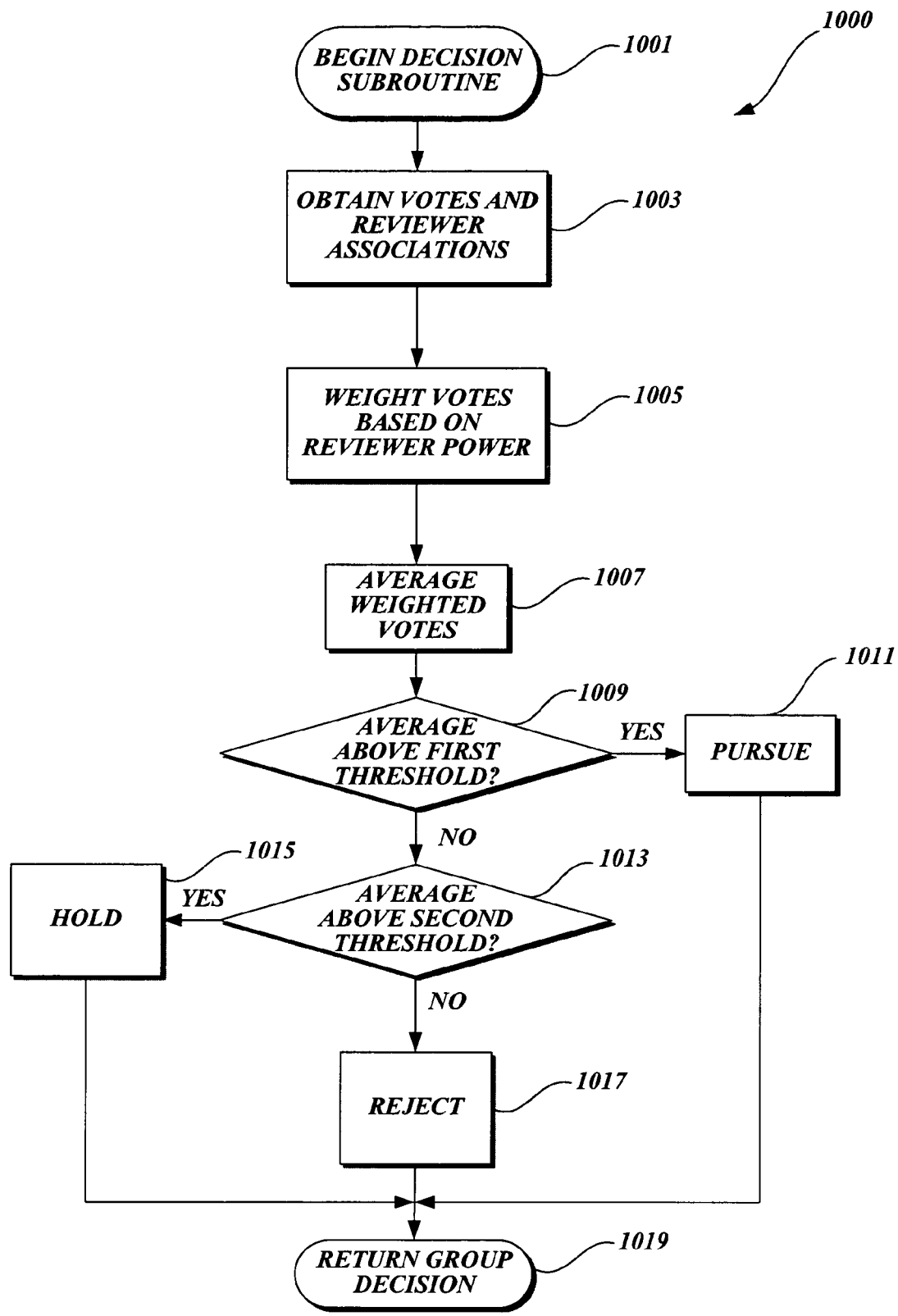
FIG. 10 illustrates a flow diagram of a decision subroutine for determining what decision is to be made based on received votes, in accordance with an embodiment of the present invention.

FIG. 10 illustrates a flow diagram of a decision subroutine 1000 for determining what decision is to be made based on received votes, in accordance with an embodiment of the present invention. The decision returned by the decision subroutine 1000 will be referred to herein as a "group decision." The decision subroutine 1000 begins at block 1001 and at block 1003 a plurality of votes and reviewer associations with those votes are obtained. As discussed above, reviewers may be assigned a power rating based on their total voting consistency average, voting results average, and/or total voting timeliness average. At block 1005, based on the power rating of the voting reviewers, the received votes may be weighted. In an alternative embodiment, votes may not be weighted and simply given equal credit. At block 1007, an average of all the votes is computed.

For example, assuming 60 votes were received about a decision to be made with respect to an object and 28 of those votes were to pursue the object, 2 votes were to hold the object, and 30 votes were to reject the object, an average may be computed. In particular, by assigning a value of 1 for all votes to pursue the object, a value of 0 for all votes to hold, and a value of −1 for all for all votes to reject the object, the resulting unweighted average would be −0.033. If the decision is to be weighted based on the power of the reviewers, the average may be adjusted accordingly. For example, a reviewer with power ratings of 5 (the highest power rating) may have voted to purse the object, and a reviewer with a power rating of 1 (the lowest power rating) may have voted to not pursue the object. Using the same example, and giving the reviewer with a power rating of 5, five times the voting weight and the reviewer with a power rating of 1, one-quarter voting weight, the resulting weighted average may be 0.048.

After averaging the votes, at decision block 1009, the subroutine 1000 may determine whether the computed average is above a first threshold. If the average is above a first threshold, at block 1011, the resulting group decision, based on the votes, is to pursue the object. Continuing with the above example, if the first threshold is 0.025, and the weighted average is 0.048, the votes would be above the first threshold and thus resulting in a group decision to pursue, as illustrated by block 1011. However, if it is determined at decision block 1009 that the average is not above a first threshold, at decision block 1013, a determination is made as to whether the average is above a second threshold, thereby indicating that the group decision, based on the votes, is to hold, as illustrated by block 1015. If the average is not above the second threshold, at block 1017, the group decision, based on the votes, is to reject. The decision subroutine 1000 completes at block 1019, returning control to the closed loop voting feedback routine (FIG. 8).

Figure 11:
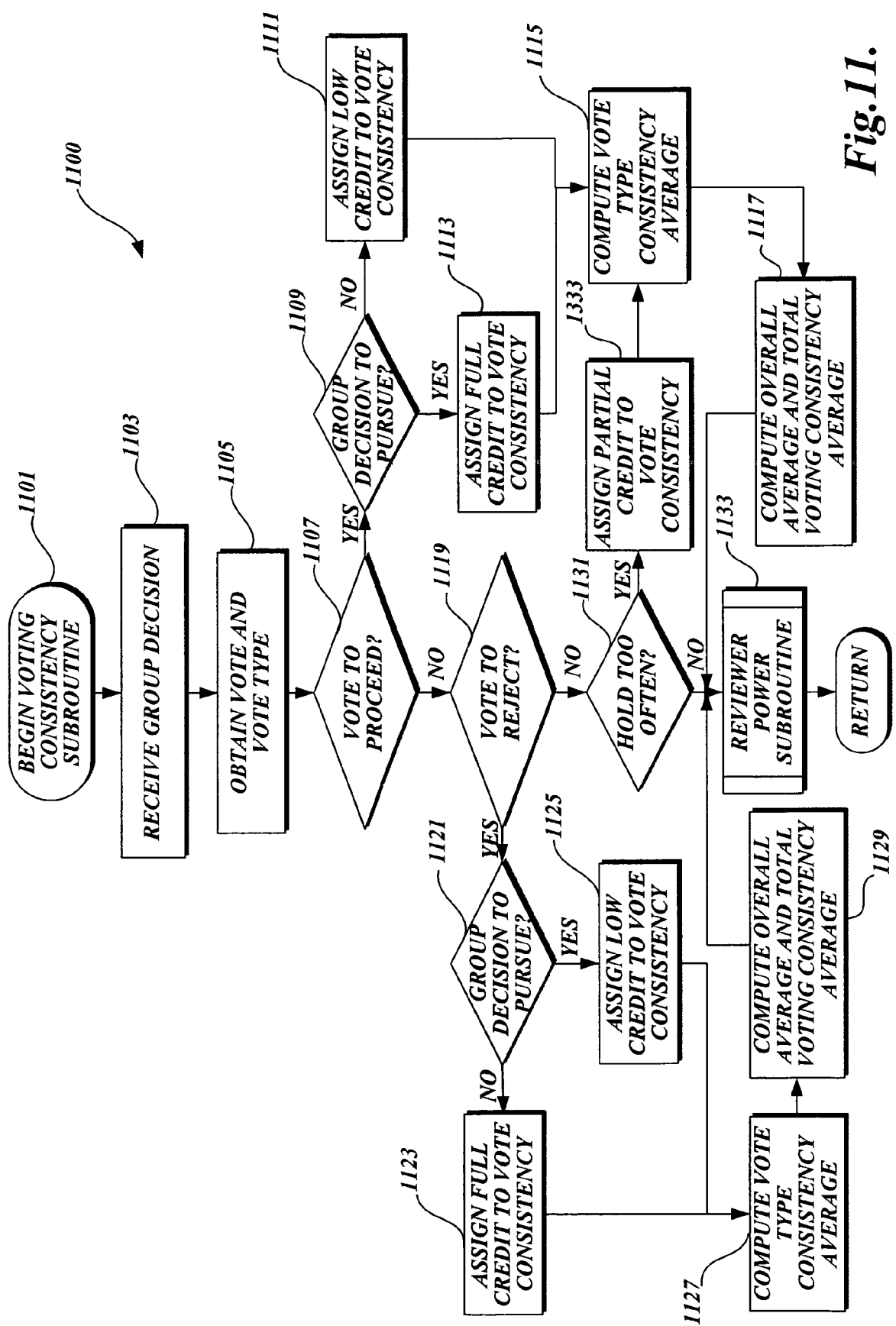
FIG. 11 illustrates a flow diagram of a voting consistency subroutine for computing the consistency of a reviewer's votes compared to votes of other reviewers, in accordance with an embodiment of the present invention.

FIG. 11 illustrates a voting consistency subroutine 1100 for computing the consistency of a reviewer's votes compared to votes of other reviewers, in accordance with an embodiment of the present invention. The voting consistency subroutine 1100 begins at block 1101 and at block 1103; a group decision 1103 is obtained. As discussed above with respect to FIG. 10, a group decision may be calculated based on votes cast by reviewers. At block 1105, a reviewer's vote and vote type are received for determining the voting consistency. As discussed above, during review of an object, several different votes may be cast, each at different stages of the review. For example, an initial vote may be cast based on an object description, a screening vote may be cast based on the results of a screening of the object, and an interview vote may be cast based on an interview of the object. At decision block 1107, a determination is made as to whether the reviewer's vote was a vote to proceed with the object. A vote to proceed in this example may be in the form of an advance vote, a pursue vote, or any other type of positive vote given for an object. If it is determined at decision block 1107 that the reviewer voted to proceed (i.e., pursue the object in this example), at decision block 1109 a determination is made as to whether the group decision in FIG. 10 resulted in a decision to pursue the object being reviewed.

If the result of the group decision is to not pursue, at block 1111 a low credit is given to the vote consistency for the reviewer. A low credit is assigned because the reviewer voted to pursue the object, but the group of reviewers as a whole decided not to pursue the object. If it is determined at decision block 1109 that the group decision is to pursue, at block 1113, full vote consistency credit is assigned to the reviewer's vote because the reviewer, consistent with the group decision, voted to pursue the object.

Once a vote consistency credit has been assigned, either at block 1111 or at block 1113, a vote type consistency average is computed, as illustrated at block 1115, for the overall consistency for that vote type for the reviewer. Additionally, at block 1117 an overall voting average and total voting consistency average are computed for the reviewer. The overall voting average may be an average for the reviewer for all votes cast for the particular object. Such an average may be a straight computation based on the votes, a weighted computation, or simply the last vote that was used in making the final decision. For example, if the review process was a three stage review including an initial voting stage, a screening voting stage, and an interview voting stage, and the reviewer voted to reject at the initial voting stage, voted to hold at the interview voting stage, and voted to acquire at the interview voting stage, the unweighted overall voting average for the reviewer would be to hold. However, if the overall voting average is to be weighted and the interview vote is given more weight than the other votes, the overall voting average may be to acquire. Similarly if the overall voting average is simply the vote that results in the final decision, the overall voting average would be to acquire.

The total voting consistency average in this example may be a consistency average for all votes by the reviewer for all vote types for all objects over a period of time. Similar to the total voting timeliness average, either or both of the overall voting average or the total voting consistency average may be weighted. For example, if it is determined that the vote consistency for the interview votes is more important than the consistency of other votes, the interview vote consistency average may be given more weight when computing the overall voting average. For the total voting consistency average, one or more of the voting consistency averages may be given additional weight in computing the total voting consistency average.

Returning back to decision block 1107, if it is determined that the reviewer's vote was not a vote to proceed, at decision block 1119 a determination is made as to whether the reviewer's vote was a vote to reject. If it is determined at decision block 1119 that the reviewer's vote was a vote to reject, a determination is made at decision block 1121 as to whether the group decision was to pursue the object. If the group decision was to not pursue the object, at block 1123 full consistency credit is given to the vote consistency for the reviewer for that vote type. A full consistency credit is given to the reviewer for that vote type because the reviewer voted not to proceed with the object and the group decision was to not proceed with the object. However, if it is determined at decision block 1121 that the group decision is to pursue the object, at block 1125 a low consistency credit is assigned to the vote consistency for the reviewer for that vote type. A low consistency credit is assigned because the reviewer voted to reject the object, but the group decision is to pursue the object.

Upon assigning a vote consistency credit, either at block 1123 or 1125, a vote type consistency average is computed, as illustrated by block 1127. As discussed above with respect to block 1115, the vote type consistency average is the consistency average for a reviewer for a particular vote type, calculated over a period of time. Additionally, at block 1129, an overall voting average and total voting consistency average may be computed. Similar to block 1117, discussed above, the overall voting average may be an average of all votes cast by the particular reviewer for the particular object. The total voting consistency average in this example is a consistency average of all votes cast by the reviewer for all vote types for all objects over a period of time.

Returning now to decision block 1119, if it is determined that the reviewer's vote was not a vote to reject, i.e., the vote was a vote to hold, at decision block 1131 a determination may be made as to whether the particular reviewer too often casts a vote to hold. Casting a vote to hold too often does not provide a benefit to the closed loop feedback routine because the reviewer is not providing decisive information. If it is determined at decision block 1131 that the reviewer has too often provided a vote to hold, at block 1133 a partial credit is given to the vote consistency, thereby potentially lowering that reviewer's power rating and consistency average, as will be discussed below. Upon assigning a partial credit at block 1133, a vote type consistency average is computed at block 1115, as discussed above. If it is determined at decision block 1131 that the reviewer has not voted too often to hold, or upon completion of computing of the overall voting average and total voting consistency average, as illustrated by blocks 1117 and 1129, the reviewer power subroutine is performed, as illustrated by block 1133. Upon completion of the reviewer power subroutine illustrated by block 1133, the voting consistency subroutine 1100 completes at block 1135. In an alternative embodiment, the reviewer power subroutine 1133 may be skipped at this point in the closed loop voting feedback routine.

Figure 12:
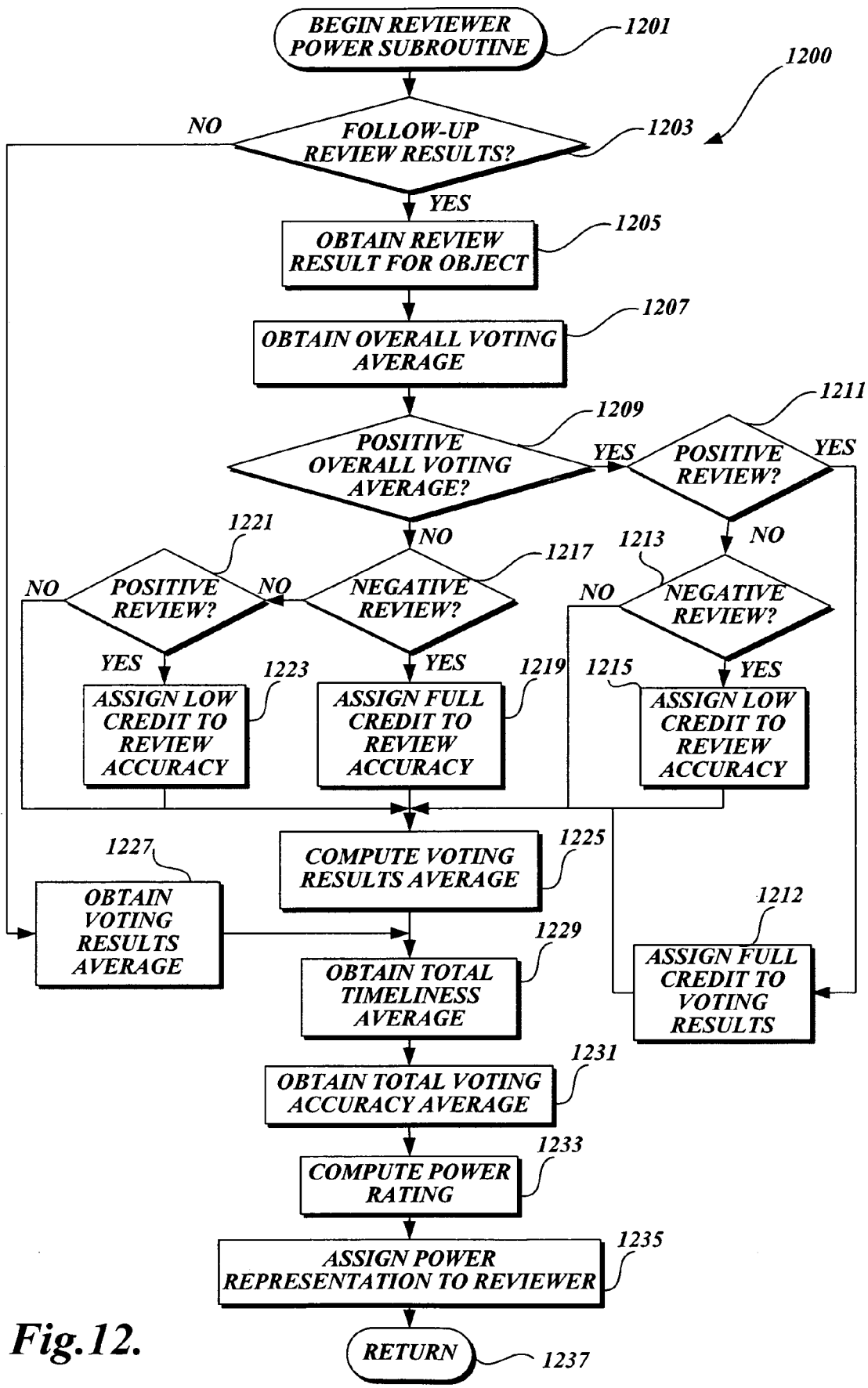
FIG. 12 illustrates a flow diagram of a reviewer power subroutine for calculating a power rating for a reviewer participating in a closed loop voting feedback routine, in accordance with an embodiment of the present invention.

FIG. 12 illustrates a flow diagram of a reviewer power subroutine 1200 for calculating a voting results average and a power rating for a reviewer participating in a closed loop voting feedback routine, in accordance with an embodiment of the present invention. The reviewer power subroutine 1200 begins at block 1201, and at decision block 1203, a determination is made as to whether performance review results for an obtained object have been received. As discussed above, if an ultimate decision is to obtain an object (e.g., hire a candidate), at some point in time thereafter, a performance review of the object may be performed to identify the performance of the object. If it is determined at decision block 1203 that performance review results have been received, at block 1205 those review results are obtained.

At block 1207 an overall voting average for the reviewer for which the power subroutine 1200 is being performed is also obtained. At decision block 1209 a determination is made as to whether the reviewer had a positive overall voting average, as calculated above at block 1129 and block 1117 (FIG. 11). A positive overall voting average illustrates that the reviewer gave an overall approval for the object that was acquired.

If it is determined at decision block 1209 that the reviewer has given a positive overall voting average, at decision block 1211, a determination is made as to whether the performance review of the object was a positive review. For example, if the rating of a performance review is on a scale of 1-to-5 and the results given are a 4, the review may be considered a positive review. In contrast, if the performance review results are a 1, the review may be considered a negative review.

If it is determined at decision block 1211 that the review is a positive review, at block 1212 full credit to the voting results for the reviewer is assigned because the reviewer, consistent with the performance review results, ultimately voted to pursue and obtain the object in question.

However, if it is determined at decision block 1211 that the performance review is not a positive review, at decision block 1213 a determination is made as to whether the review is a negative review. As discussed above, a negative review would be a low score on a performance review. If it is determined that the performance review results are negative, at block 1215, a low credit is assigned to the voting results for that reviewer, because that reviewer had voted to pursue the object when in reality that object was not a good acquisition. However, if it is determined at decision block 1213 that the review is not a negative review (i.e., it is a neutral review), neither a high credit nor a low credit is assigned to the voting results, thereby not affecting the reviewer's overall power rating.

Returning back to decision block 1209, if it is determined that the overall voting average is not a positive overall voting average, at decision block 1217 a determination is made as to whether the performance review was a negative review. If it is determined at decision block 1217 that the performance review is a negative review, at block 1219 full credit is assigned to the voting results for that reviewer. Full credit is assigned to the voting results of the reviewer because the reviewer had voted not to pursue the object and the review for that object was not a positive review, i.e., the object should not have been pursued.

If it is determined at decision block 1217 that the performance review is not a negative review, at decision block 1221 a determination is made as to whether the performance review is a positive review. If it is determined at decision block 1221 that the review is a positive review, i.e., the object was a good acquisition decision, at block 1223 a low credit is assigned to the voting results for that reviewer. A low credit is assigned because that reviewer had voted to not acquire the object in question, when upon review, it is determined that it was a good hiring or acquisition decision.

At block 1225, upon assignment of credit at block 1215, 1219 or 1223, a voting results average may be calculated for the reviewer in question for all objects for which votes have been cast and a performance review has been received. Referring back briefly to decision block 1203, if it is determined that performance review results have not been received, at block 1227, the voting results average for the reviewer is obtained.

Upon obtaining the voting results average at block 1227 or upon computation of a new voting results average at block 1225, at block 1229 a total voting timeliness average for the reviewer is obtained. At block 1231, a total voting consistency average is also obtained. Based on the voting results average, the total voting timeliness average, and the total voting consistency average, at block 1233 a power rating for the reviewer in question is computed. As will be appreciated, different weighting values may be assigned to the different averages that are used to compute the power rating. For example, it may be determined that the voting results average may be the most important average computed and thereby given a higher weighting when computing the power rating for the reviewer.

At block 1235, a power representation in the form of a graphical icon is associated with the reviewer for comparison relative to other reviewers of the closed loop voting feedback routine. Alternatively, a numerical rating, such as a score, may be used to graphically represent the power rating of the reviewer for comparison relative to the reviewers of the closed loop voting feedback routine. At block 1237 the reviewer power subroutine completes, returning control to the voting feedback routine 800 (FIG. 8).

While embodiments of the invention have been illustrated and described, it will be appreciated that various changes can be made therein without departing from the spirit and scope of the invention. For example, in the candidate hiring embodiments described above, a reviewer's vote with respect to a candidate may result in an action to pursue, hold, or reject the candidate. In other embodiments, other forms of action may be taken as a result of reviewer voting. The scope of the invention is not limited to the precise forms disclosed above, but is defined by the following claims and equivalents thereto. claimed are defined as follows:

The embodiments of the invention in which an exclusive property or privilege is:

1. A non-transitory computer-accessible medium having instructions stored thereon that, in response to execution by a computing system having a processor and a memory, cause the computing system to:

receive a first plurality of votes corresponding to a decision to be made with respect to an object, wherein at least one of the first plurality of votes is a first vote received from a reviewer;

based at least in part on the first plurality of received votes, determine a first action to take with respect to the object;

receive a second plurality of votes corresponding to the decision to be made with respect to the object, wherein at least one of the second plurality of votes is a second vote received from the reviewer;

based at least in part on the second plurality of received votes, determine a second action to take with respect to the object;

receive a performance review of the object;

update a voting results average for the reviewer based at least in part the performance review, the voting results average being a function of a plurality of previously reviewed objects upon which the reviewer has voted;

update a total voting timeliness average for the reviewer based at least in part on a voting timeliness of the one of the first plurality of received votes and a voting timeliness of the one of the second plurality of received votes;

update a total voting consistency average for the reviewer based at least in part on:

a consensus between the one of the first plurality of received votes and a remainder of the first plurality of received votes excluding the one of the first plurality of received votes; and a consensus between the one of the second plurality of received votes and a remainder of the second plurality of received votes excluding the one of the second plurality of received votes; and calculate a power rating of the reviewer as a function of: the voting results average for the reviewer, the total voting timeliness average for the reviewer, and the total voting consistency average for the reviewer.

2. The non-transitory computer-accessible medium of claim 1, wherein the object is a job candidate.

3. The non-transitory computer-accessible medium of claim 1, wherein the power rating of the reviewer is used to weight votes received from the reviewer.

4. The non-transitory computer-accessible medium of claim 1, wherein the power rating of the reviewer is subject to change based at least in part on future votes received from the reviewer.

5. The non-transitory computer-accessible medium of claim 1, further comprising instructions that direct the computing system to:

determine a third action to take with respect to the object based at least in part on the first and second votes received from the reviewer, wherein the first and second votes received from the reviewer are weighted by the power rating of the reviewer, and the third action to take is selected from a group consisting of pursuing the object, rejecting the object, and holding the object for a determination at a later time.

6. The non-transitory computer-accessible medium of claim 1, wherein the instructions further cause the computing system to generate a report embodying at least one of the total voting consistency average, the total voting timeliness average, the voting results average, or the power rating.

7. The non-transitory computer-accessible medium of claim 1, wherein the total voting timeliness average is based at least in part on a plurality of voting timeliness scores calculated as a function of a respective one of a plurality of previously cast votes.

8. The non-transitory computer-accessible medium of claim 7, wherein the voting timeliness scores are weighted according to a respective one of a plurality of previous decisions.

9. The non-transitory computer-accessible medium of claim 1, wherein the total voting consistency average is based at least in part on a plurality of voting consistency scores calculated as a function of a respective one of a plurality of previously cast votes.

10. The non-transitory computer-accessible medium of claim 9, wherein the voting consistency scores are weighted according to a respective one of a plurality of previous decisions.

11. The non-transitory computer-accessible medium of claim 1, wherein determining the first action or the second action comprises determining whether a voting score meets a predefined threshold.

12. The non-transitory computer-accessible medium of claim 5, wherein determining the third action comprises determining whether a voting score meets a predefined threshold.

13. The non-transitory computer-accessible medium of claim 1, wherein the first vote or the second vote is weighted as a function of a previously calculated power rating.

14. A method for determining an action to take with respect to an object, the method comprising:
   receiving, by a computing device, a plurality of votes from a plurality of reviewers corresponding to a decision to be made with respect to the object;
   acquiring, by the computing device, after taking the decision, a performance review of the object;
   updating, by the computing device, a voting results average for one of the reviewers based at least in part the performance review, the voting results average being a function of a plurality of previously reviewed objects upon which the one of the reviewers has voted;
   updating a total voting timeliness average for the one of the reviewers based at least in part on a voting timeliness of the object;
   updating a total voting consistency average for the one of the reviewers based at least in part on a one of the votes cast by the one of the reviewers and the plurality of votes;
   determining, by the computing device, a power rating for the one of the reviewers based at least in part on the voting results average for the one of the reviewers, the total voting timeliness average for the one of the reviewers, and the total voting consistency average for the one of the reviewers; and
   determining, by the computing device, the action to take with respect to the object based at least in part on the plurality of votes received from the plurality of reviewers, wherein the one of the votes cast by one of the reviewers is weighted in accordance with the power rating of the one of the reviewers.

15. The method of claim 14, wherein the object is a job candidate.

16. The method of claim 14, wherein the total voting timeliness average is a calculated average value based at least in part on an average punctuality of all votes cast by the one of the reviewers.

17. The method of claim 14, wherein the power rating for the one of the reviewers is subject to change based at least in part on future votes received from the one of the reviewers.

18. The method of claim 14, wherein the action to take is selected from a group consisting of pursuing the object, rejecting the object, and holding the object for a determination at a later time.

19. The method of claim 14, further comprising generating, by the computing device, a report embodying at least one of the total voting consistency average, the total voting timeliness average, the voting results average, or the power rating.

20. The method of claim 14, wherein the total voting timeliness average is based at least in part on a plurality of voting timeliness scores calculated as a function of a respective one of a plurality of previously cast votes.

21. The method of claim 20, wherein the voting timeliness scores are weighted according to a respective one of a plurality of previous decisions.

22. The method claim 14, wherein the total voting consistency average is based at least in part on a plurality of voting consistency scores calculated as a function of a respective one of a plurality of previously cast votes.

23. The method claim 22, wherein the voting consistency scores are weighted according to a respective one of a plurality of previous decisions.

24. The method of claim 14, wherein determining the action comprises determining whether a voting score meets a predefined threshold.

25. A system, comprising:
   at least one computing device;
   an application executable in the at least one computing device, comprising:
   logic that obtains a plurality of votes from a plurality of reviewers corresponding to a decision to be made with respect to an object;
   logic that obtains, after taking the decision, a performance review of the object;
   logic that updates a voting results average for one of the reviewers based at least in part the performance review, the voting results average being a function of a plurality of previously reviewed objects upon which the one of the reviewers has voted;
   logic that updates a total voting timeliness average for the one of the reviewers based at least in part on a voting timeliness of the object;
   logic that updates a total voting consistency average for the one of the reviewers based at least in part on a one of the votes cast by the one of the reviewers and the plurality of votes;
   logic that calculates a power rating for one of the reviewers based at least in part on the voting results average for the one of the reviewers, the total voting timeliness average for the one of the reviewers, and the total voting consistency average for the one of the reviewers; and
   logic that determines an action to take with respect to the object based at least in part on the plurality of votes received from the plurality of reviewers, wherein the one of the votes from the one of the reviewers is weighted in accordance with the power rating of the one of the reviewers.

26. The system of claim 25, wherein the object is a job candidate.

27. The system of claim 25, wherein the total voting timeliness average for the one of the reviewers is a calculated average value based at least in part on an average punctuality of all votes cast by the one of the reviewers.

28. The system of claim 18, wherein the power rating for the one of the reviewers is used to weight votes received from the one of the reviewers.

29. The system of claim 18, wherein the power rating for the one of the reviewers changes based at least in part on future votes cast by the one of the reviewers.

30. The system of claim 25, wherein the action to take is selected from a group consisting of pursuing the object, rejecting the object, and holding the object for a determination at a later time.

31. The system of claim 25, wherein the total voting timeliness average is based at least in part on a plurality of voting timeliness scores calculated as a function of a respective one of a plurality of previously cast votes, the voting timeliness scores being weighted according to a respective one of a plurality of previous decisions.

32. The system of claim 25, wherein the total voting consistency average is based at least in part on a plurality of voting consistency scores calculated as a function of a respective one of a plurality of previously cast votes, the voting consistency scores being weighted according to a respective one of a plurality of previous decisions.

33. The system of claim 25, wherein the logic that determines the action comprises logic that determines whether a voting score meets a predefined threshold.

\* \* \* \* \*